(12) United States Patent
Lindsay

(10) Patent No.: US 8,667,311 B2
(45) Date of Patent: Mar. 4, 2014

(54) METHOD AND SYSTEM FOR OPTIMIZED POWER MANAGEMENT FOR A NETWORK DEVICE SUPPORTING PCI-E AND ENERGY EFFICIENT ETHERNET

(75) Inventor: Steven Lindsay, Bend, OR (US)

(73) Assignee: Broadcom Corporation, Irvine, CA (US)

( * ) Notice: Subject to any disclaimer, the term of this patent is extended or adjusted under 35 U.S.C. 154(b) by 981 days.

(21) Appl. No.: 12/489,739

(22) Filed: Jun. 23, 2009

(65) Prior Publication Data

US 2010/0325463 A1 Dec. 23, 2010

(51) Int. Cl.
*G06F 1/26* (2006.01)
*G06F 1/32* (2006.01)

(52) U.S. Cl.
USPC ........... 713/320; 713/300; 713/310; 713/321; 713/323; 713/324

(58) Field of Classification Search
None
See application file for complete search history.

(56) References Cited

U.S. PATENT DOCUMENTS

| | | | |
|---|---|---|---|
| 6,963,985 B2 * | 11/2005 | Stachura et al. | 713/310 |
| 7,243,220 B2 * | 7/2007 | Hsu | 713/1 |
| 7,571,335 B2 * | 8/2009 | Lee | 713/330 |
| 8,112,646 B2 * | 2/2012 | Tsai | 713/320 |
| 2003/0167413 A1 * | 9/2003 | Stachura et al. | 713/300 |
| 2005/0097378 A1 * | 5/2005 | Hwang | 713/320 |
| 2005/0188232 A1 * | 8/2005 | Weng et al. | 713/320 |
| 2007/0150762 A1 * | 6/2007 | Sharma et al. | 713/300 |
| 2009/0119524 A1 * | 5/2009 | Hays | 713/322 |
| 2010/0002610 A1 * | 1/2010 | Bowser et al. | 370/311 |

* cited by examiner

*Primary Examiner* — Fahmida Rahman
(74) *Attorney, Agent, or Firm* — Thomas|Horstemeyer, LLP.

(57) ABSTRACT

Aspects of a method and system for optimized power management for a network device supporting PCI-E and energy efficient Ethernet are provided. In this regard, in a network interface controller that supports energy efficient Ethernet, a PCI-E core may be transitioned from a low power PCI-E state to a full power PCI-E state when a PHY core in the network interface controller initiates transition from a low power mode to a full power mode and before the PHY core receives an Ethernet packet. In another embodiment, the PHY core in the network interface controller may be transitioned from a low power mode to a full power mode when the PCI-E core initiates transition from a low power PCI-E state to a full power PCI-E state, and before the PCI-E core receives a command to send an Ethernet packet.

26 Claims, 4 Drawing Sheets

METHOD AND SYSTEM FOR OPTIMIZED POWER MANAGEMENT FOR A NETWORK DEVICE SUPPORTING PCI-E AND ENERGY EFFICIENT ETHERNET

CROSS-REFERENCE TO RELATED APPLICATIONS/INCORPORATION BY REFERENCE

Not Applicable.

FIELD OF THE INVENTION

Certain embodiments of the invention relate to a method and system for networking. More specifically, certain embodiments of the invention relate to a method and system for optimized power management for a network device supporting PCI-E and energy efficient Ethernet.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates may often result in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Energy Efficient Ethernet (EEE) is an emerging feature for Ethernet devices that is being defined by the IEEE 802.3az task force. The basic goal of EEE is for Ethernet network links to dynamically enter a lower power state when the Ethernet link is idle, and then to be able to transition back to a higher power state running at full speed when there is network activity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for optimized power management for a network device supporting PCI-E and energy efficient Ethernet, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for optimized power management for a network device supporting PCI-E and energy efficient Ethernet. In this regard, in a network interface controller that supports energy efficient Ethernet, a PCI-E core may be transitioned from a low power PCI-E state to a full power PCI-E state when a PHY core in the network interface controller initiates transition from a low power mode to a full power mode, and before the PHY core receives an Ethernet packet. In another embodiment, the PHY core in the network interface controller may be transitioned from a low power mode to a full power mode when the PCI-E core initiates transition from a low power PCI-E state to a full power PCI-E state, and before the PCI-E core receives a command to send an Ethernet packet.

Figure 1:
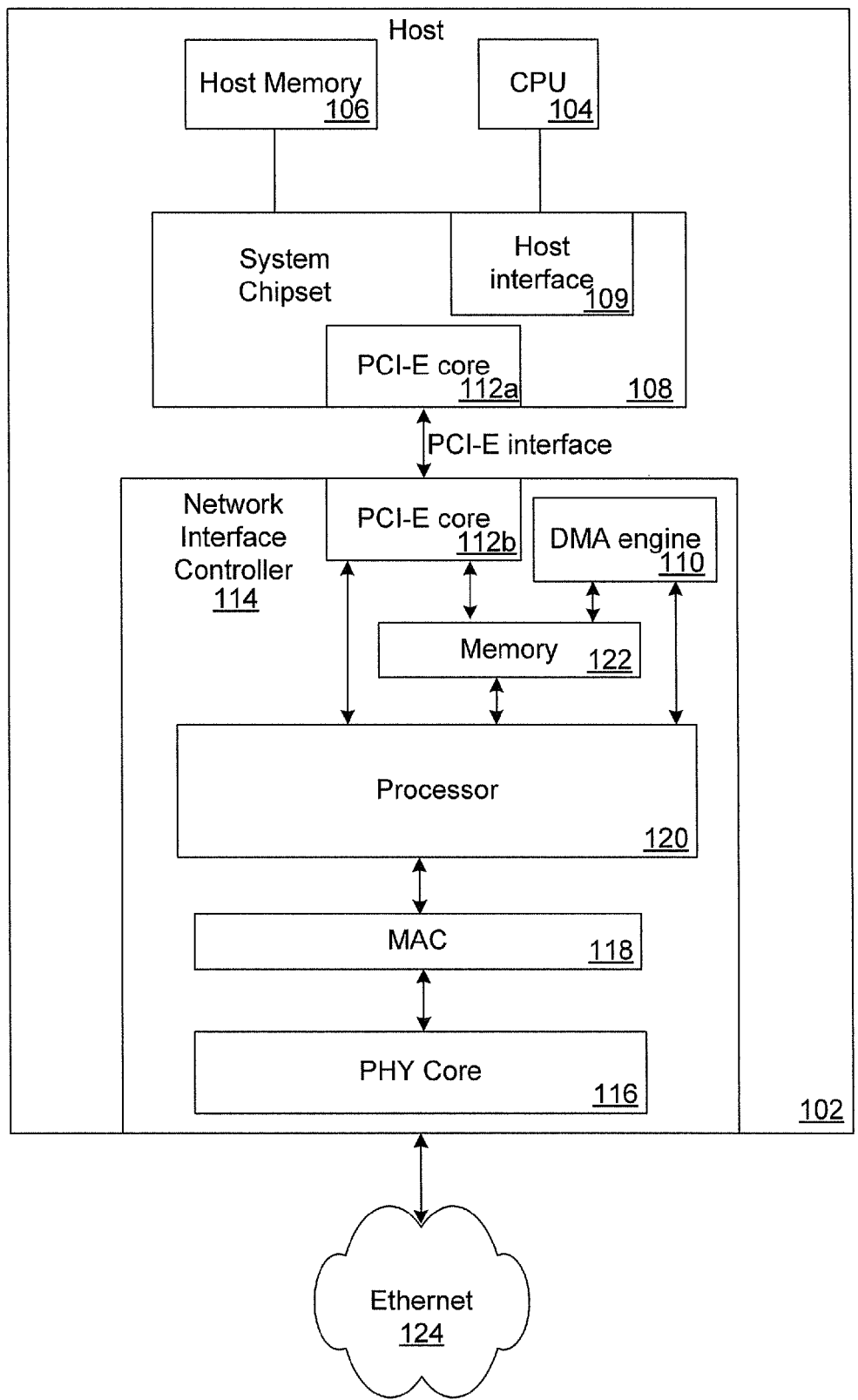
FIG. 1 is a block diagram illustrating an exemplary network interface controller that is operable to support PCI-E and a host, in accordance with an embodiment of the invention.
Figure 3:
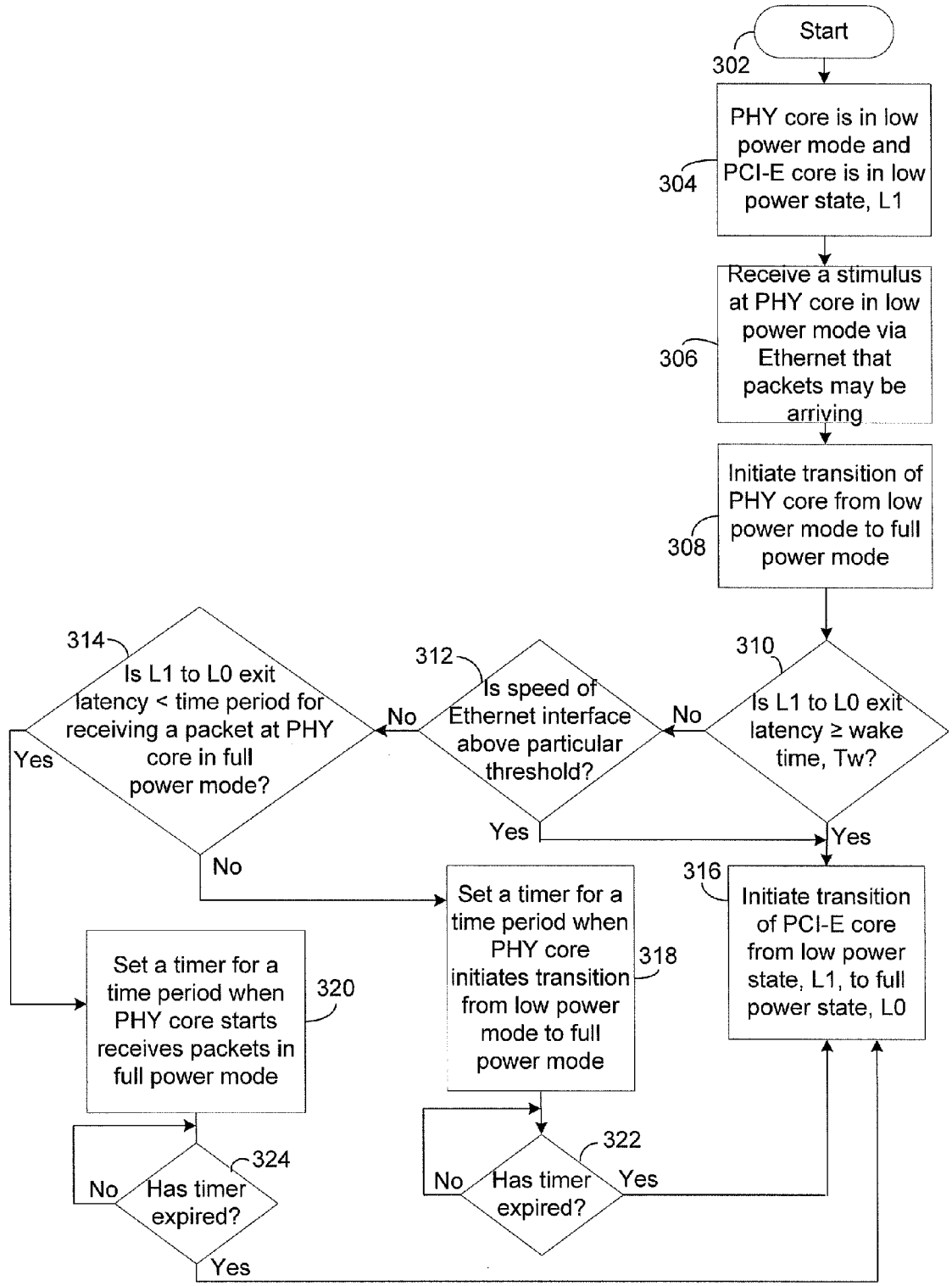
FIG. 3 is a flow chart illustrating exemplary steps for optimizing power management in a PCI-E core of a network interface controller that is operable to support PCI-E and energy efficient Ethernet, in accordance with an embodiment of the invention.

FIG. 1 is a block diagram illustrating an exemplary network interface controller that is operable to support PCI-E and a host, in accordance with an embodiment of the invention. Referring to FIG. 3, there is shown a host 102 and a network interface, for example, the Ethernet interface 124.

The host 102 may comprise a CPU 104, a host memory 106, a system chipset 108 and a network interface controller 114. The system chipset 108 may comprise a host interface 109, and a peripheral component interconnect-Express (PCI-E) core 112a. The PCI-E core 112a may be coupled to another PCI-E core 112b in the network interface controller 114 via a PCI-E interface. The system chipset 108 may be coupled to PCI-E buses and/or devices, one or more processors, CPU 104 and memory, for example, host memory 106. Notwithstanding, the host memory 106 may be directly coupled to the network interface controller 114. The system chipset 108 may comprise suitable logic, interfaces, code, and/or one or more circuits that may be operable to transfer data from a storage device or a LAN interface controller directly to random access memory (RAM), which may speed up processing of data.

Although illustrated, for example, as a CPU 104 and an Ethernet interface 124, the present invention need not be so limited to such examples and may employ, for example, any type of processor and any type of data link layer or physical media, respectively. In another embodiment of the invention, the CPU 104 may be enabled to handle a plurality of networking protocols and may be directly coupled to the Ethernet interface 124. Furthermore, the present invention also contemplates different degrees of integration and separation between the components illustrated in FIG. 1.

The network interface controller 114 may be coupled to the system chipset 108 via the PCI-E core 112. The network interface controller 114 may comprise a PCI-E core 112b, physical layer (PHY) core 116, a medium access control (MAC) 118, a processor 120, a direct memory access (DMA) engine 110, and a memory 122.

The PHY core 116 may be operable to receive and/or communicate packets via the Ethernet interface 124. The PHY core 116 may be operable to send and/or receive data on a carrier, for example, cables. The MAC 118 may comprise suitable logic, interfaces, code, and/or one or more circuits that may be operable to control access to a medium that may be shared between a plurality of entities. The MAC 118 may comprise a MAC address that is unique to each network interface controller 114. The MAC 118 may be operable to encode and/or decode data packets into bits. The MAC 118 may be operable to furnish transmission protocol knowledge and/or management and may handle errors in the physical layer, flow control and frame synchronization. The MAC 118 may be operable to control how a computer on the network gains access to the data and permission to transmit it.

The processor 120 may comprise suitable logic, interfaces, code, and/or one or more circuits that may be operable to determine the connection identifier and/or a packet type for each packet. The memory 122 may comprise suitable logic, interfaces, code, and/or one or more circuits that may be operable to employ a buffering scheme to store network inbound packets until they are placed in the host RAM by the DMA engine 110. The memory 122 may be coupled to the DMA engine 110. The memory 122 may be operable to temporarily store data associated with outbound packets after that data has been transferred from the host 102 to the network interface controller 114 via the DMA engine 110, and before the network interface controller 114 is able to transmit that data via the Ethernet interface 124.

Figure 2:
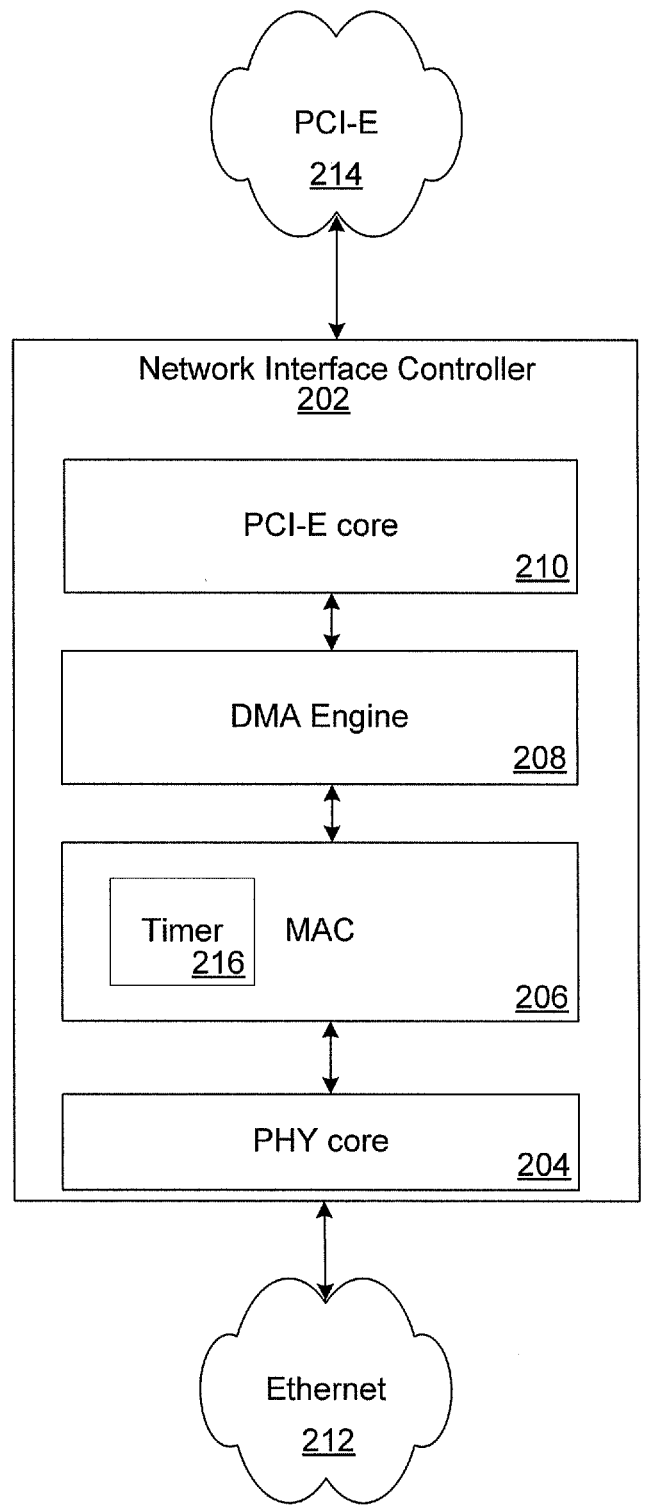
FIG. 2 is a block diagram illustrating an exemplary network interface controller that is operable to support PCI-E and energy efficient Ethernet for optimizing power management, in accordance with an embodiment of the invention.

FIG. 2 is a block diagram illustrating an exemplary network interface controller that is operable to support PCI-E and energy efficient Ethernet for optimizing power management, in accordance with an embodiment of the invention. Referring to FIG. 2, there is shown a network interface controller 202, a network interface, for example, the Ethernet 212, and a PCI-E core 214. The network interface 202 may comprise a physical layer (PHY) processor 204, a MAC 206, a DMA engine 208, and a PCI-E core 210.

The network interface controller 202 may comprise suitable logic, interfaces, code, and/or one or more circuits that may be operable to support Energy Efficient Ethernet (EEE), for example.

The PHY core 204 may comprise suitable logic, interfaces, code, and/or one or more circuits that may be operable to receive and/or communicate packets via the network interface, for example, the Ethernet 212. When the network interface controller 202 has been idle for a particular period of time, the PHY core 204 may transition to a lower power mode, for example, a low power idle mode, as specified by IEEE 802.3az specification. The transition of the PHY core 204 to the low power mode may be transparent to the operating system on the network endpoint. The time period of transitioning from the low power mode to a full power mode may be referred to as the wake time, Tw, of the PHY core 204.

The MAC 206 may comprise suitable logic, interfaces, code, and/or one or more circuits that may be operable to support the Ethernet 802.3 protocol, interface to the PHY core 204, support packet classification and error detection logic for incoming packets, and support memory for temporary packet buffering. The MAC 206 may be operable to handle offloading of tasks such as checksum calculations, accelerating TCP/IP or IPSEC traffic, for example. The MAC 206 may be operable to centrally manage power management policies for the network interface controller 202. The MAC 206 may comprise a timer 216. The timer 216 may comprise suitable logic, code, and/or one or more circuits that may be operable to store a particular time period.

The DMA engine 208 may comprise suitable logic, interfaces, code, and/or one or more circuits that may be operable to initiate direct memory access (DMA) read and write requests to the PCI-E core 210.

The PCI-E core 210 may comprise suitable logic, interfaces, code, and/or one or more circuits that may be operable to generate DMA requests on the PCI-E core 214, support PCI-E protocol, and provide PCI-E target support. The PCI-E core 210 may comprise a power saving feature, for example, Active State Power Management (ASPM). The ASPM feature of the PCI-E core 210 may comprise two power states, for example, a low power PCI-E state, L1, and a full power PCI-E state, L0. The low power PCI-E state, L1 may be operable to save considerably more power than the full power PCI-E state, L0, but may also have a greater impact to performance and responsiveness. When the low power PCI-E state, L1, is enabled on a given PCI-E core 214, and if the PCI-E core 214 has been inactive for a period of time, for example, 10-5000 microseconds, the PCI-E core 210 may transition to the low power PCI-E state, L1 that may consume much less power than the full power PCI-E state, L0. While in the low power PCI-E state, L1, a PCI-E clock in the PCI-E core 210 may be stopped and a phase locked loop (PLL) may be powered down to save power in the network interface controller 114. However, the PCI-E core 210 needs to be returned to the full power PCI-E state, L0 for a device to start a transfer of data across the PCI-E core 214. The time period of transitioning from the low power PCI-E state, L1, to the full power PCI-E state, L0 may be referred to as the L1 to L0 exit latency of the PCI-E core 210, for example. The L1 to L0 exit latency may begin when a device wants to initiate a PCI-E transaction, for example, a DMA transfer and may initiate the transition of the PCI-E core 210 to the full power PCI-E state, L0. The L1 to L0 exit latency may end when the PCI-E core 210 has transitioned to the full power PCI-E state, L0.

In operation, when a packet is received by the network interface controller 202 via the network interface, for example, the Ethernet 212, the data in the packet may enter the network interface controller 202 at the PHY core 204, and be processed by the MAC 206. The entire packet may be received in order for the MAC 206 to perform a cyclic redundancy check (CRC) on the packet to check for errors. In instances where there are no errors with the packet, the DMA engine 208 may initiate one or more DMA requests to the PCI-E core 210 to transfer the packet to host memory via the PCI-E core 214.

In order to transmit a packet, the CPU 104 may initiate a PCI-E write transaction to the network interface controller 202. The network interface controller 202 may be operable to initiate a DMA read over the PCI-E core 214. The data received from the host 102 may be assembled by the network interface controller 202 in the MAC 206. The MAC 206 may be operable to transmit the data to the PHY core 204. The PHY core 204 may be operable to transmit the packets via the network interface, for example, the Ethernet 212.

In instances where PCI-E core 210 is in a low power PCI-E state, L1, and the PHY core 204 is in a low power mode, for example, low power idle, the network interface controller 202 may want to receive a packet via the network interface, for example, the Ethernet 212 at the PHY core 204. The network interface controller 202 may be operable to speculatively initiate a transition of the PCI-E core 210 from the low power PCI-E state, L1 to the full power PCI-E state, L0, when the PHY core 204 senses that its remote network peer is bringing the network interface back to full power in order to send a packet and before the network interface controller 202 has received the packet. Accordingly, the network interface controller 202 may be operable to mask at least a portion of the L1 to L0 exit latency of the PCI-E core 210.

The PHY core 204 may be operable to communicate a signal to the MAC 206 when the PHY core 204 senses that it is about to receive a packet via the network interface, for example, the Ethernet 212. The MAC 206 may be operable to communicate a signal to the PCI-E core 210 to initiate a transition from the low power PCI-E state, L1, to the full power PCI-E state, L0 when the PHY core 204 in the network interface controller 202 senses that it is about to receive a packet and initiates transition from the low power mode to the full power mode. The communicated signal may be edge triggered or level-triggered, for example. The MAC 206 may be operable to generate a pulse, for example, or assert a signal to initiate a transition from the low power PCI-E state, L1, to the full power PCI-E state, L0.

The timer 216 may be configured for a particular time period after the start of the transition of the PHY core 204 in the network interface controller 202 from the low power mode to the full power mode, if the L1 to L0 exit latency of the transition from the low power PCI-E state, L1, to the full power PCI-E state, L0, is lesser than the wake time, Tw, of the transition of the PHY core 204 from the low power mode to the full power mode. The timer 216 may also be configured for a particular time period after the transition of the PHY core 204 in the network interface controller 202 from the low power mode to the full power mode, if the speed of the network interface, for example, the Ethernet 212 to the network interface controller 202 is lesser than a threshold value, for example, lesser than 1 GBps. Notwithstanding, the invention may not be so limited, and other threshold values may be utilized without limiting the scope of the invention.

The timer 216 may also be configured for a particular time period after receiving a packet at the PHY core 204 in the full power mode, if the L1 to L0 exit latency of the transition from the low power PCI-E state, L1, to the full power PCI-E state, L0, is lesser than the wake time, Tw, of the transition of the PHY core 204 from the low power mode to the full power mode. The timer 216 may also be configured for a particular time period after receiving a packet at the PHY core 204 in the full power mode, if the L1 to L0 exit latency of the transition from the low power PCI-E state, L1, to the full power PCI-E state, L0, is lesser than a time period for the receiving of the packet at the PHY core 204 in the full power mode.

In accordance with an embodiment of the invention, in instances where the PCI-E core 210 is in a low power PCI-E state, L1, and the PHY core 204 is in a low power mode, and the network interface controller 202 receives a signal from its PCI-E peer to bring the PCI-E interface 214 back to full power PCI-E state, L0, then the network interface controller 202 may be operable to speculatively initiate a transition of the PHY core 204 from the low power mode to a full power mode before the PCI-E core 210 has fully transitioned to a full power PCI-E state, L0. Accordingly, the network interface controller 202 may be operable to mask at least a portion of the wake time, Tw of the PHY core 204.

The PCI-E core 210 may be operable to communicate a signal to the MAC 206 when a command is received via the PCI-E core 214 to bring the PCI-E core 214 out of a low power PCI-E state, L1, and back to a full power PCI-E state, L0. The MAC 206 may be operable to communicate a signal to the PHY core 204 to initiate a transition from the low power mode to the full power mode when the PCI-E core 210 receives a command and initiates transition from the low power PCI-E state, L1, to the full power PCI-E state, L0.

The timer 216 may be configured for a particular time period after the start of the transition of the PCI-E core 210 from the low power PCI-E state, L1, to the full power PCI-E state, L0, if the L1 to L0 exit latency of the transition of the PCI-E core 210 from the low power PCI-E state, L1, to the full power PCI-E state, L0 is greater than the wake time, Tw, of the transition of the PHY core 204 from the low power mode to the full power mode.

In accordance with various embodiments of the invention, one or more transitions from the full power PCI-E state, L0, to the low power PCI-E state, L1, and back to the full power PCI-E state, L0 may be prevented by resetting a PCI-E core 210 inactivity timer earlier than it would have otherwise been reset. The PCI-E core 210 inactivity timer may be utilized to determine when the PCI-E core 210 may transition from a full power PCI-E state, L0, to the low power PCI-E state, L1 due to inactivity. The PCI-E core 210 inactivity timer may be reset, for example, when the PHY core 204 initiates transition from a low power mode to a full power mode. Accordingly, one or more transitions from the full power PCI-E state, L0, to the low power PCI-E state, L1 may be avoided where the PCI-E core 210 inactivity timer was about to expire when the PHY core 204 initiates transition from a low power mode to a full power mode and would have expired before a packet had been received and been ready for DMA via the PCI-E core 214. The network interface controller 202 may be operable to reduce system latency by avoiding the one or more transitions from the full power PCI-E state, L0, to the low power PCI-E state, L1.

FIG. 3 is a flow chart illustrating exemplary steps for optimizing power management in a PCI-E core of a network interface controller that is operable to support PCI-E and energy efficient Ethernet, in accordance with an embodiment of the invention. Referring to FIG. 3, the exemplary steps may begin at step 302. In step 304, the PCI-E core 210 is in a low power PCI-E state, L1, and the PHY core 204 is in a low power mode. In step 306, the network interface controller 202 may be operable to receive a command from a network peer to exit a low power mode and that one or more packets may be arriving via the network interface, for example, the Ethernet 212 at the PHY core 204. In step 308, the PHY core 204 may start to transition from the low power mode to the full power mode. In step 310, it may be determined whether the L1 to L0 exit latency of the transition of the PCI-E core 210 from the low power PCI-E state, L1, to the full power PCI-E state, L0, is greater than or equal to the wake time, Tw, of the transition of the PHY core 204 from the low power mode to the full power mode. In cases where the L1 to L0 exit latency of the PCI-E core 210 is greater than or equal to the wake time, Tw of the PHY core 204, control passes to step 316. In step 316, the MAC 206 may be operable to initiate the transition of the PCI-E core 210 from the low power PCI-E state, L1, to the full power PCI-E state, L0. In instances where the L1 to L0 exit latency of the PCI-E core 210 is not greater than or equal to the wake time, Tw of the PHY core 204, control passes to step 312.

In step 312, it may be determined whether the speed of the network interface, for example, the Ethernet 212 to the network interface controller 202 is greater than or equal to a threshold value, for example, greater than or equal to 1 GBps.

In cases where the speed of the network interface, for example, the Ethernet 212 is greater than or equal to a threshold value, control passes to step 316. In cases where the speed of the network interface, for example, the Ethernet 212 is not greater than or equal to a threshold value, control passes to step 314.

In step 314, it may be determined whether the L1 to L0 exit latency of the transition of the PCI-E core 210 from the low power PCI-E state, L1, to the full power PCI-E state, L0, is lesser than a time period for the receiving of a packet at the PHY core 204 in the full power mode. In cases where the L1 to L0 exit latency of the PCI-E core 210 is not lesser than a time period for the receiving of a packet at the PHY core 204 in the full power mode, control passes to step 318. In step 318, a timer 216 may be configured for a particular time period when the PHY core 204 initiates transition from the low power mode to the full power mode. In step 322, it may be determined whether the configured timer has expired. In cases where the configured timer has not expired, control returns to step 322. In instances where the configured timer has expired, control passes to step 316.

In cases where the L1 to L0 exit latency of the PCI-E core 210 is lesser than a time period for the receiving of a packet at the PHY core 204 in the full power mode, control passes to step 320. In step 320, a timer 216 may be configured to expire after a certain time period that starts when the PHY core 204 starts receiving Ethernet packet data after it was restored to full power mode. In step 324, it may be determined whether the configured timer has expired. In cases where the configured timer has not expired, control returns to step 324. In instances where the configured timer has expired, control passes to step 316.

Figure 4:
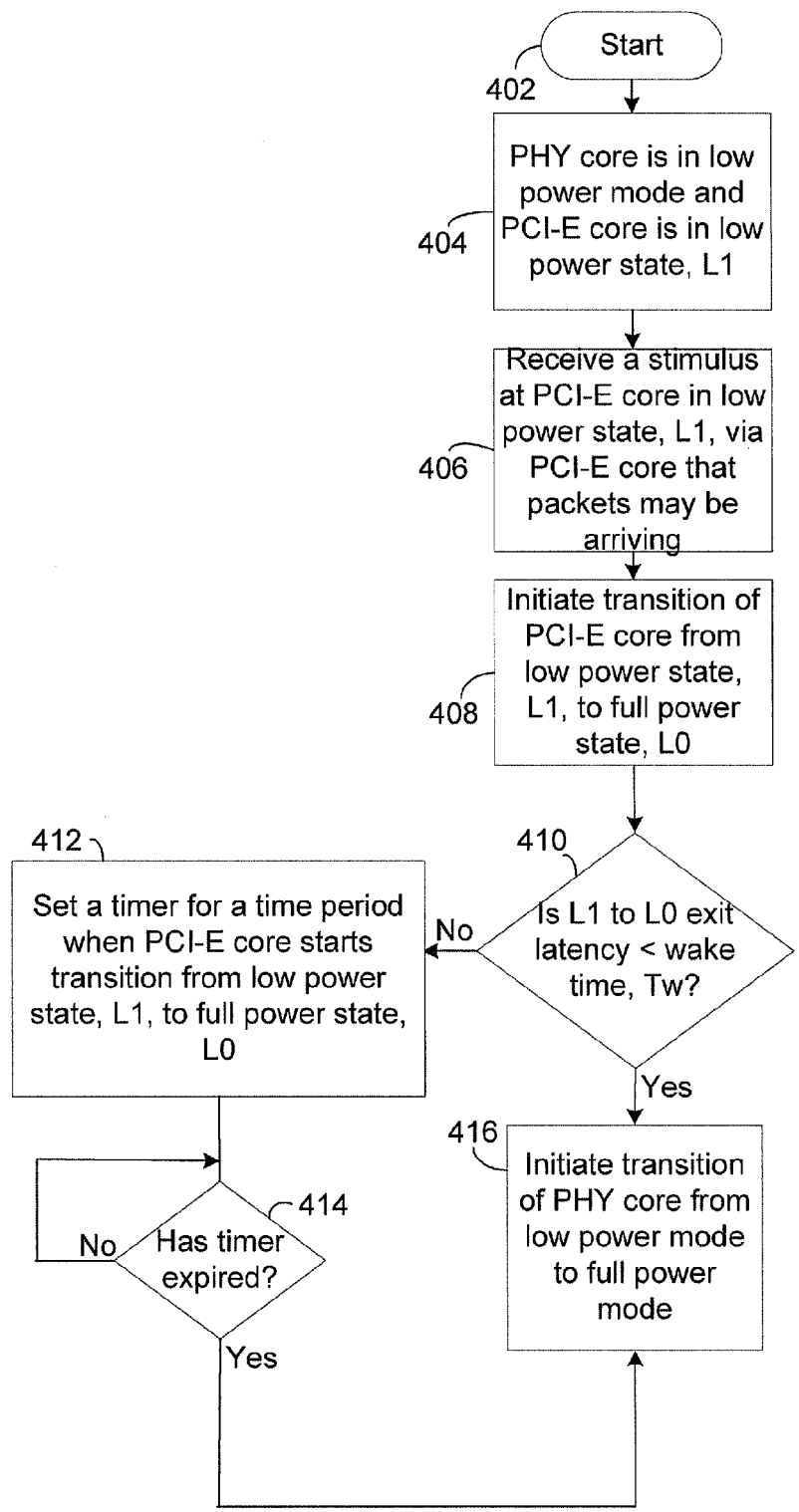
FIG. 4 is a flow chart illustrating exemplary steps for optimizing power management in a PHY core of a network interface controller that is operable to support PCI-E and energy efficient Ethernet, in accordance with an embodiment of the invention.

FIG. 4 is a flow chart illustrating exemplary steps for optimizing power management in a PHY core of a network interface controller that is operable to support PCI-E and energy efficient Ethernet, in accordance with an embodiment of the invention. Referring to FIG. 4, the exemplary steps may begin at step 402. In step 404, the PCI-E core 210 is in a low power PCI-E state, L1, and the PHY core 204 is in a low power mode. In step 406, the network interface controller 202 may receive a command on the PCI-E core 214 that the network interface controller 202 is supposed to transition from a low power PCI-E state, L1, to the full power PCI-E state, L0. This may be an indication that the system chipset 108 may likely send PCI-E packets to the network interface controller 202. In step 408, the PCI-E core 210 may start to transition from the low power PCI-E state, L1, to the full power PCI-E state, L0. In step 410, it may be determined whether the L1 to L0 exit latency of the transition of the PCI-E core 210 from the low power PCI-E state, L1, to the full power PCI-E state, L0, is lesser than the wake time, Tw, of the transition of the PHY core 204 from the low power mode to the full power mode. In cases where the L1 to L0 exit latency of the PCI-E core 210 is lesser than the wake time, Tw of the PHY core 204, control passes to step 416. In step 416, the MAC 206 may initiate the transition of the PHY core 204 from the low power mode to the full power mode. In instances where the L1 to L0 exit latency of the PCI-E core 210 is not lesser than the wake time, Tw of the PHY core 204, control passes to step 412.

In step 412, a timer 216 may be configured for a particular time period when the PCI-E core 210 starts transition from the low power PCI-E state, L1, to the full power PCI-E state, L0. In step 414, it may be determined whether the configured timer has expired. In instances where the configured timer has not expired, control returns to step 414. In instances where the configured timer has expired, control passes to step 416.

In accordance with an embodiment of the invention, a method and system for optimized power management for a network device supporting PCI-E and energy efficient Ethernet may comprise one or more circuits for use in a network interface controller 202 (FIG. 2) that supports energy efficient Ethernet that are operable to transition a Peripheral Component Interconnect-Express (PCI-E) controller 210 (FIG. 2) from a low power PCI-E state, L1, to a full power PCI-E state, L0, when a PHY core 204 (FIG. 2) in the network interface controller 202 initiates transition from a low power mode to a full power mode, and before the PHY core 204 receives an Ethernet packet. The one or more circuits in the network interface controller 202 may be operable to transition the PCI-E core 210 from the low power PCI-E state, L1, to the full power PCI-E state, L0, based on one or more of a speed of a network interface, for example, the Ethernet 212 to the network interface controller 202, a first time period, for example, the L1 to L0 exit latency of the transition from the low power PCI-E state, L1, to the full power PCI-E state, L0, a second time period, for example, the wake time, Tw, of the transition of the PHY core 204 from the low power mode to the full power mode, and/or a speed of a PCI-E core 214 (FIG. 2) to the network interface controller 202.

The one or more circuits in the network interface controller 202 may be operable to transition the PCI-E core 210 from the low power PCI-E state, L1, to the full power PCI-E state L0 when the PHY core 204 in the network interface controller 202 transitions from the low power mode to the full power mode, if the first time period, for example, the L1 to L0 exit latency of the transition from the low power PCI-E state, L1, to the full power PCI-E state L0 is greater than the second time period, for example, the wake time, Tw, of the transition of the PHY core 204 from the low power mode to the full power mode. The one or more circuits in the network interface controller 202 may be operable to transition the PCI-E core 210 from the low power PCI-E state, L1, to the full power PCI-E state L0 when the PHY core 204 in the network interface controller 202 transitions from the low power mode to the full power mode, if the speed of the network interface, for example, the Ethernet 212 to the network interface controller 202 is greater than or equal to a threshold value, for example, greater than or equal to 1 GBps.

The one or more circuits in the network interface controller 202 may be operable to transition the PCI-E core 210 from the low power PCI-E state, L1, to the full power PCI-E state L0 after a timer 216 (FIG. 2) expires. The timer 216 may be implemented in hardware or a combination of hardware and software, for example. The one or more circuits in the network interface controller 202 may be operable to configure the timer 216 for a third time period after the transition of the PHY core 204 in the network interface controller 202 from the low power mode to the full power mode, if the first time period, for example, the L1 to L0 exit latency of the transition from the low power PCI-E state, L1, to the full power PCI-E state, L0, is lesser than the second time period, for example, the wake time, Tw, of the transition of the PHY core 204 from the low power mode to the full power mode. The one or more circuits in the network interface controller 202 may be operable to configure the timer 216 for a third time period after the transition of the PHY core 204 in the network interface controller 202 from the low power mode to the full power mode, if the speed of the network interface, for example, the Ethernet 212 to the network interface controller 202 is lesser than a threshold value, for example, lesser than 1 GBps.

The one or more circuits in the network interface controller 202 may be operable to configure the timer 216 for a fourth time period after receiving a packet at the PHY core 204 in the full power mode, if the first time period, for example, the L1 to L0 exit latency of the transition from the low power PCI-E state, L1, to the full power PCI-E state, L0, is lesser than the second time period, for example, the wake time, Tw, of the transition of the PHY core 204 from the low power mode to the full power mode. The one or more circuits in the network interface controller 202 may be operable to configure the timer 216 for a fourth time period after receiving a packet at the PHY core 204 in the full power mode, if the first time period, for example, the L1 to L0 exit latency of the transition from the low power PCI-E state, L1, to the full power PCI-E state, L0, is lesser than a fifth time period for the receiving of the packet at the PHY core 204 in the full power mode.

In accordance with an embodiment of the invention, one or more circuits for use in the network interface controller 202 that supports energy efficient Ethernet may be operable to transition a PHY core 204 in the network interface controller 202 from a low power mode to a full power mode when a PCI-E core 210 initiates transition from a low power PCI-E state, L1, to a full power PCI-E state, L0, and before the PCI-E core 210 receives a command to send an Ethernet packet. The one or more circuits in the network interface controller 202 may be operable to transition the PHY core 204 from the low power mode to the full power mode based on one or both of a first time period, for example, the L1 to L0 exit latency of the transition of the PCI-E core 210 from the low power PCI-E state, L1, to the full power PCI-E state, L0, and/or a second time period, for example, the wake time, Tw, of the transition from the low power mode to the full power mode.

The one or more circuits in the network interface controller 202 may be operable to transition the PHY core 204 from the low power mode to the full power mode when the PCI-E core 210 transitions from the low power PCI-E state, L1, to the full power PCI-E state, L0, if the first time period, for example, the L1 to L0 exit latency of the transition of the PCI-E core 210 from the low power PCI-E state, L1, to the full power PCI-E state, L0 is lesser than the second time period, for example, the wake time, Tw, of the transition from the low power mode to the full power mode.

The one or more circuits in the network interface controller 202 may be operable to transition the PHY core 204 from the low power mode to the full power mode after a timer 216 expires. The one or more circuits in the network interface controller 202 may be operable to configure the timer 216 for a third time period after the transition of the PCI-E core 210 from the low power PCI-E state, L1, to the full power PCI-E state, L0, if the first time period, for example, the L1 to L0 exit latency of the transition of the PCI-E core 210 from the low power PCI-E state, L1, to the full power PCI-E state, L0 is lesser than the second time period, for example, the wake time, Tw, of the transition from the low power mode to the full power mode.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for optimized power management for a network device supporting PCI-E and energy efficient Ethernet.

Accordingly, the present invention may be realized in hardware, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, comprising:
in a network interface controller that supports energy efficient Ethernet, performing using one or more circuits in said network interface controller:
transitioning a Peripheral Component Interconnect-Express (PCI-E) core from a low power PCI-E state to a full power PCI-E state in response to a PHY core in said network interface controller initiating a transition from a low power mode of the PHY core to a full power mode, where said PCI-E core transitions from said low power PCI-E state to said full power PCI-E state before said PHY core receives an Ethernet packet and where transitioning from said low power PCI-E state to said full power PCI-E state is started after a timer expires; and
configuring said timer for a third time period after said transition of said PHY core from said low power mode to said full power mode is started, if a first time period corresponding to said transition from said low power PCI-E state to said full power PCI-E state is less than a second time period corresponding to said transition of said PHY core from said low power mode to said full power mode or a speed of a network interface to said network interface controller is less than a threshold value.

2. The method according to claim 1, wherein transitioning from said low power PCI-E state to said full power PCI-E state is started when said PHY core in said network interface controller starts transitioning from said low power mode to said full power mode, if said first time period corresponding to said transition from said low power PCI-E state to said full power PCI-E state is greater than said second time period corresponding to said transition of said PHY core from said low power mode to said full power mode or said speed of said network interface to said network interface controller is greater than or equal to the threshold value.

3. The method according to claim 1, comprising configuring said timer for a fourth time period after receiving said Ethernet packet at said PHY core in said full power mode, if said first time period corresponding to said transition from said low power PCI-E state to said full power PCI-E state is less than said second time period corresponding to said transition of said PHY core from said low power mode to said full power mode and said first time period corresponding to said transition from said low power PCI-E state to said full power PCI-E state is less than a fifth time period corresponding to said receiving of said Ethernet packet at said PHY core in said full power mode.

4. The method of claim 1, wherein said PHY core is configured to send or receive Ethernet packets via an Ethernet interface.

5. The method of claim 1, wherein said network interface controller is communicatively coupled to a system chipset via said PCI-E core.

6. The method of claim 1, wherein a medium access control (MAC) of said network interface controller includes said timer.

7. A method for communication, comprising:
in a network interface controller that supports energy efficient Ethernet, performing using one or more circuits in said network interface controller:
transitioning a PHY core in said network interface controller from a low power mode to a full Dower mode in response to a Peripheral Component Interconnect-Express (PCI-E) core initiating a transition from a low Dower PCI-E state to a full power PCI-E state, where said PHY core transitions from said low power mode to said full power mode before said PCI-E core receives a command to send an Ethernet packet and where transitioning from said low power mode of said PHY core to said full power mode is started when said PCI-E core transitions from said low power PCI-E state to said full power PCI-E state, if a first time period of said transition corresponding to said PCI-E core from said low power PCI-E state to said full power PCI-E state is less than a second time period corresponding to said transition from said low power mode of said PHY core to said full power mode.

8. The method of claim 7, wherein said PHY core is configured to send or receive Ethernet packets via an Ethernet interface.

9. The method of claim 7, wherein said network interface controller is communicatively coupled to a system chipset via said PCI-E core.

10. A method for communication, comprising:
in a network interface controller that supports energy efficient Ethernet, performing using one or more circuits in said network interface controller:
transitioning a PHY core in said network interface controller from a low power mode to a full power mode in response to a Peripheral Component Interconnect-Express (PCI-E) core initiating a transition from a low power PCI-E state to a full power PCI-E state, where said PHY core transitions from said low power mode to said full power mode before said PCI-E core receives a command to send an Ethernet packet and where transitioning from said low power mode to said full power mode is started based on one or both of: a first time period corresponding to said transition of said PCI-E core from said low power PCI-E state to said full power PCI-E state or a second time period corresponding to said transition of said PHY core from said low power mode to said full power mode and is started after a timer expires; and
configuring said timer for a third time period after said transition of said PCI-E core from said low power PCI-E state to said full power PCI-E state, if said first time period corresponding to said transition of said PCI-E core from said low power PCI-E state to said full power PCI-E state is less than said second time period corresponding to said transition from said low power mode to said full power mode.

11. The method of claim 10, wherein said PHY core is configured to send or receive Ethernet packets via an Ethernet interface.

12. The method of claim 10, wherein said network interface controller is communicatively coupled to a system chipset via said PCI-E core.

13. The method of claim 10, wherein a medium access control (MAC) of said network interface controller includes said timer.

14. A system for communication, comprising:
one or more circuits in a network interface controller that supports energy efficient Ethernet, wherein said one or more circuits are operable to:
transition a Peripheral Component Interconnect-Express (PCI-E) core from a low power PCI-E state to a full power PCI-E state in response to a PHY core in said network interface controller initiating a transition from a low power mode of the PHY core to a full power mode, where said PCI-E core transitions from said low power PCI-E state to said full power PCI-E state before said PHY core receives an Ethernet packet and where said transition from said low power PCI-E state to said full power PCI-E state is started after a timer expires and is based on one or more of: a speed of a network interface to said network interface controller, a first time period corresponding to said transition from said low power PCI-E state to said full power PCI-E state, a second time period corresponding to said transition of said PHY core from said low power mode to said full power mode, or a speed of said PCI-E core to said network interface controller; and
configure said timer for a third time period after said transition of said PHY core from said low power mode to said full power mode is started, if said first time period corresponding to said transition from said low power PCI-E state to said full power PCI-E state is less than said second time period corresponding to said transition of said PHY core from said low power mode to said full power mode or said speed of said network interface to said network interface controller is less than a threshold value.

15. The system according to claim 14, wherein said transition of said PCI-E core from said low power PCI-E state to said full power PCI-E state is started when said PHY core in said network interface controller starts transitioning from said low power mode to said full power mode, if said first time period corresponding to said transition from said low power PCI-E state to said full power PCI-E state is greater than said second time period corresponding to said transition of said PHY core from said low power mode to said full power mode or said speed of said network interface to said network interface controller is greater than or equal to the threshold value.

16. The system according to claim 14, wherein said one or more circuits are operable to configure said timer for a fourth time period after receiving said Ethernet packet at said PHY core in said full power mode, if said first time period corresponding to said transition from said low power PCI-E state to said full power PCI-E state is less than said second time period corresponding to said transition of said PHY core from said low power mode to said full power mode and said first time period corresponding to said transition from said low power PCI-E state to said full power PCI-E state is less than a fifth time period corresponding to said receiving of said Ethernet packet at said PHY core in said full power mode.

17. The system of claim 14, wherein said PHY core is configured to send or receive Ethernet packets via an Ethernet interface.

18. The system of claim 14, wherein said network interface controller is communicatively coupled to a system chipset via said PCI-E core.

19. The system of claim 14, wherein said network interface controller comprises a medium access control (MAC) including said timer.

20. A system for communication, comprising:
one or more circuits in a network interface controller that supports energy efficient Ethernet, wherein said one or more circuits are operable to:
transition a PHY core in said network interface controller from a low power mode to a full power mode in response to a Peripheral Component Interconnect-Express (PCI-E) core initiating a transition from a low power PCI-E state to a full power PCI-E state, where said PHY core transitions from said low power mode to said full power mode before said PCI-E core receives a command to send an Ethernet packet and where said transition of said PHY core from said low power mode to said full power mode is started when said PCI-E core transitions from said low power PCI-E state to said full power PCI-E state, if a first time period corresponding to said transition of said PCI-E core from said low power PCI-E state to said full power PCI-E state is less than a second time period corresponding to said transition from said low power mode of said PHY core to said full power mode.

21. The system of claim 20, wherein said PHY core is configured to send or receive Ethernet packets via an Ethernet interface.

22. The system of claim 20, wherein said network interface controller is communicatively coupled to a system chipset via said PCI-E core.

23. A system for communication, comprising:
one or more circuits in a network interface controller that supports energy efficient Ethernet, wherein said one or more circuits are operable to:
transition a PHY core in said network interface controller from a low power mode to a full power mode in response to a Peripheral Component Interconnect-Express (PCI-E) core initiating a transition from a low power PCI-E state to a full power PCI-E state, where said PHY core transitions from said low power mode to said full power mode before said PCI-E core receives a command to send an Ethernet packet and where said transition of said PHY core from said low power mode to said full power mode is started after a timer expires and is based on one or both of: a first time period corresponding to said transition of said PCI-E core from said low power PCI-E state to said full power PCI-E state or a second time period corresponding to said transition from said low power mode of said PHY core to said full power mode; and
configure said timer for a third time period after said transition of said PCI-E core from said low power PCI-E state to said full power PCI-E state, if said first time period corresponding to said transition of said PCI-E core from said low power PCI-E state to said full power PCI-E state is less than said second time period corresponding to said transition from said low power mode to said full power mode.

24. The system of claim 23, wherein said PHY core is configured to send or receive Ethernet packets via an Ethernet interface.

25. The system of claim 23, wherein said network interface controller is communicatively coupled to a system chipset via said PCI-E core.

26. The system of claim 23, wherein said network interface controller comprises a medium access control (MAC) including said timer.

* * * * *